United States Patent [19]
Bushnell et al.

[11] 3,784,001

[45] Jan. 8, 1974

[54] ANTICLOCKSPRING CONNECTOR

[75] Inventors: Clifford B. Bushnell, Rochester;
Edward J. Sheffer, Caledonia;
Robert C. Sutliff, Rochester, all of N.Y.

[73] Assignee: Eastman Kodak Company, Rochester, N.Y.

[22] Filed: Feb. 14, 1972

[21] Appl. No.: 226,007

[52] U.S. Cl. ........ 206/52 F, 206/59 E, 206/DIG. 36, 242/71.1
[51] Int. Cl. ........................................... B65d 85/67
[58] Field of Search .............. 206/52 F, 52 R, 59 E, 206/59 C; 242/71.1, 71.8, 55.2, 68.5; 220/DIG. 31

[56] References Cited
UNITED STATES PATENTS

| | | | |
|---|---|---|---|
| 3,613,876 | 10/1971 | Kohler et al. | 206/52 F |
| 2,335,766 | 11/1943 | Kinloch | 206/59 E |
| 1,623,486 | 4/1927 | Meyering | 206/52 F |

*Primary Examiner*—William T. Dixson, Jr.
*Attorney*—William T. French et al.

[57] ABSTRACT

In a film cartridge having a core support hub extending at least partially through the film core, clockspringing of a roll of film therein is prevented by providing a frangible connector between the core and a portion of the cartridge which has sufficient strength to prevent the core from rotating during shipping but which will break as the film is withdrawn from the cartridge, permitting the core to rotate. The frangible connector is formed of a molded plastic insert arranged to engage both the core and the cartridge and having a necked-down portion which will fracture when a sufficient force is applied thereto, as by pulling the film from the cartridge. At the same time, the necked-down portion is sufficiently strong to prevent clockspringing of the film during shipment.

7 Claims, 5 Drawing Figures

3,784,001

ANTICLOCKSPRING CONNECTOR

BACKGROUND OF THE INVENTION

The present invention is directed to an anticlockspringing connector which is applicable to packaging a rolled web product, and more particularly to a package in which a spool of photographic film may be marketed and which protects the film until and while it is placed into a camera. More particularly, the present invention prevents a spool in such a package from rotating during handling and shipping, thereby preventing clockspringing or unwinding of the web or film from the spool with subsequent handling problems and/or damage to the film.

In various film package or cartridges now in use, the film is wound on a spool or core, with or without flanges, and is disposed within a magazine which totally surrounds the film and protects it from light and other damaging effects. One end of the film is normally secured or cinched to the core or spool center and the other end extends out through a slot in the magazine and is fastened to the surface of the cartridge until it is inserted in the camera and the film is threaded. It has been found that there is a tendency for film in such cartridges to unwind during handling and shipping. Inasmuch as the inner end is connected to the core or the spool center and the outer end is secured to the outer surface of the cartridge, the film acts as a clockspring to turn the spool as it unwinds. Such clockspringing can result in scratching of the film surface causing a deterioration in the quality of the image that may be recorded thereon. In other instances the film can clockspring to the extent that the outer convolutions of film jam against the inner surface of the cartridge making subsequent unreeling of the film difficult or impossible.

Various attempts have been made at providing anticlockspringing devices to prevent unwinding of the film in cartridges. However, most such devices have been costly and have generally added to the weight of the cartridge. Moreover, many such prior art devices had to be removed prior to use of the film, necessitating the opening of the cartridge.

In U. S. Pat. No. 3,613,876, two methods of preventing such clockspringing are shown whereby the core is frangibly connected to a portion of the cartridge wall by means of an adhesive tape or an ultrasonic or other type of weldment. However, it has been found that the force required to break either the tape or the weldment cannot be accurately controlled during production so that some connections are broken during shipment and permit clockspringing, or will not break at all preventing the withdrawal of the web for use.

SUMMARY OF THE INVENTION

It is thus apparent that a simple, reliable and economical method of preventing web or film clockspringing in such cartridges is extremely desirable and would significantly minimize the web or film damage and/or subsequent difficulties in removing the web or film from the cartridge without adding to the cost or weight of the cartridge. Moreover, the force required to fracture the connection must be simply controlled within a predetermined range.

Accordingly, the present invention provides a web cartridge having a roll of web or film disposed therein which has a center core having a plurality of substantially radial ribs in the end thereof. A frangible connector means is provided for holding the core substantially stationary with respect to the cartridge until a tensile force is applied to the end of the web to remove it from the cartridge. The frangible connector between the core and cartridge is arranged so that it prevents rotation of the core with respect to the cartridge during handling and shipment of the cartridge and yet will break upon a relatively light pull upon the end of the web to permit the rotation of the core within the cartridge and the withdrawal of the web from the cartridge.

Furthermore, the present invention provides an anticlockspringing device utilizing a frangible connector which is easily inserted into the cartridge during assembly and which is pre-formed with a frangible portion which may be ruptured by a substantially uniform predetermined and controlled, relatively light pull on the end of the film.

The various features of novelty which characterize the present invention are pointed out with particularity in the claims annexed to and forming a part of this specification. For a better understanding of the invention, its operating advantages and the specific objects obtained by its use, reference should be had to the accompanying drawings and descriptive matter in which the preferred embodiments of the present invention are illustrated and described.

DESCRIPTION OF THE PREFERRED EMBODIMENT

Figure 4:
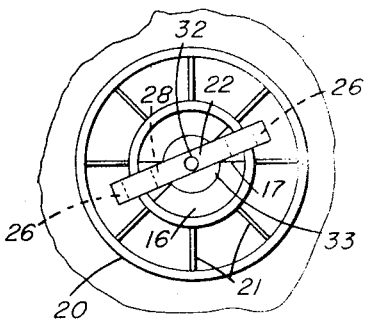
FIG. 4 is an enlarged detail of a portion of the cartridge illustrated in FIG. 1.
Figure 1:
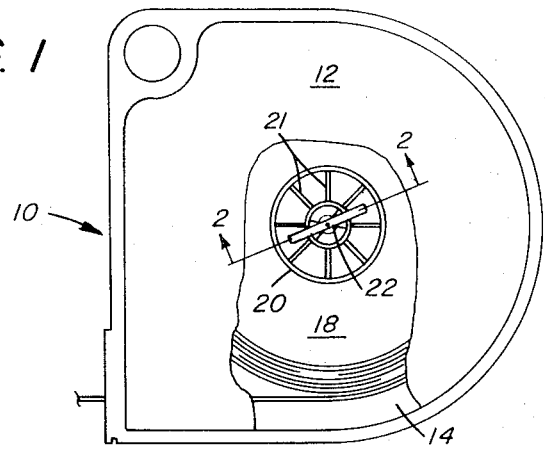
FIG. 1 is a partial cross section through a film cartridge showing a preferred embodiment of the present invention.
Figure 2:
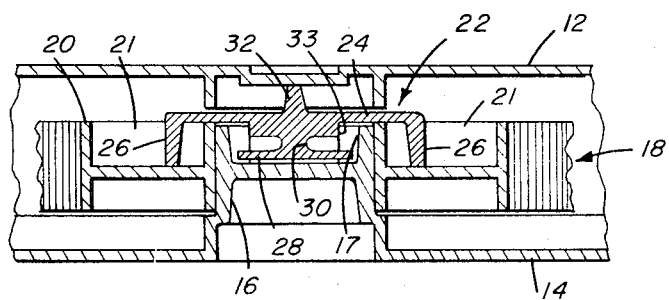
FIG. 2 is an enlarged cross section through a portion of the film cartridge illustrated in FIG. 1 taken along line 2—2 of FIG. 1.

A preferred embodiment of the present invention is illustrated in FIGS. 1-4 with the central portion of a film or web-bearing cartridge 10 shown in section. The cartridge has an upper and a lower wall member 12 and 14 with a shape substantially similar to the roll product contained therein and is provided with a peripheral wall member connecting wall members 12 and 14. The lower wall member 14 is provided with a recessed portion 16 forming a spool hub which locates and supports the roll of film or web material 18 contained in the cartridge. The end of the hub is provided with a slot or recess 17 which cooperates with an anticlockspring connector 22 in a manner to be described below. The preferred shape of the recess 17 is best illustrated in FIG. 4 and comprises a circular central portion and wedge shaped end portions. The rolled web or film product 18 is wound upon a central core or spool 20 which has an inner diameter substantially equal to the diameter of hub 16, whereby the rolled product is supported in the cartridge for rotation when the film product is withdrawn. The core also is provided with a plurality of radial reinforcing ribs 21 in a manner well known in the art. It has been found that such rolled web products, and particularly photographic film have a tendency to clockspring, or unwind, during storage or shipment with the core 20 rotating about hub 16 with the resultant disadvantages noted above.

Accordingly, the present invention provides a frangible connector member 22 which is disposed in the cartridge and extends between the core 20 and a portion of the cartridge body. In the preferred embodiment, the connector member 22 has a first, C-shaped portion 24 having axially extending arms 26 at the outer extremities which are arranged to engage the ribs 21 of core 20 with the width of arms 26 being less than the distance between adjacent ribs of the core. A second, bar portion 28 of the connector member is axially spaced from the C-shaped portion and is disposed between the arms 26. The bar portion is connected to the first, C-shaped portion by a frangible, necked-down connection 30 and is arranged to fit within the slot or recess 17 formed in the end of hub 16 to prevent rotation of the connector member and, by means of the engagement of the core ribs 21 by the arms 26, the film product within the cartridge. The connector member 22 is preferably formed, as by injection molding, of a plastic material, the structural strength of which is known whereby the necked-down connection 30 may be accurately and repeatably formed to fracture upon the application of a selected, predetermined torque to the connector member. Thus, when a relatively light tensile force is applied to the end of the film product that extends out through an opening in the peripheral wall of the cartridge to permit threading of the film end thereof to a camera or other apparatus, the connector member is broken permitting rotation of the film core. As illustrated, the connector member may be provided with a small, centrally disposed, axially extending nib 32 which extends from the first portion generally opposite the necked-down connection 30. The nib has a length such that it bears lightly against the inner surface of wall member 12 to hold the bar portion 28 in the recess after the cartridge is assembled. The connector member is also provided with a circular pilot portion 33 between the center of the C-shaped portion 24 and the necked-down connection 30. The pilot portion is arranged to fit within the circular central portion of recess 17 to retain the C-shaped portion after the connector member is broken. Moreover, the nib cooperates with the configuration of the remainder of the connector to prevent any portion of the connector from being dislodged and jamming between the roll of film product and the cartridge preventing the removal of the film product. It will be noted that the wedge-shaped end portions of the recess 17 facilitate the insertion of the connector member during cartridge assembly. With this construction, the angular position of the core 20 during assembly is not critical since the connector member may be rotated slightly to permit the arms 26 to passs between the ribs 21 of the core.

Figure 5:
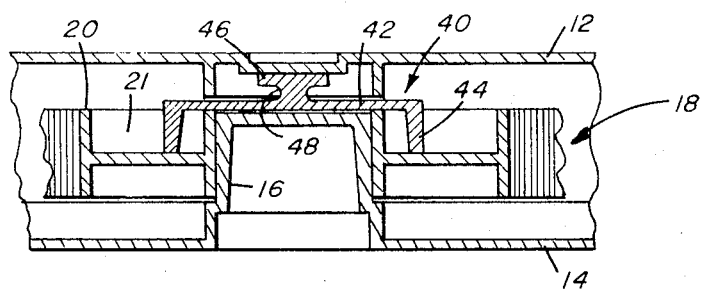
FIG. 5 is a partial cross section through a portion of a film cartridge showing an alternate embodiment of the present invention.
Figure 3:
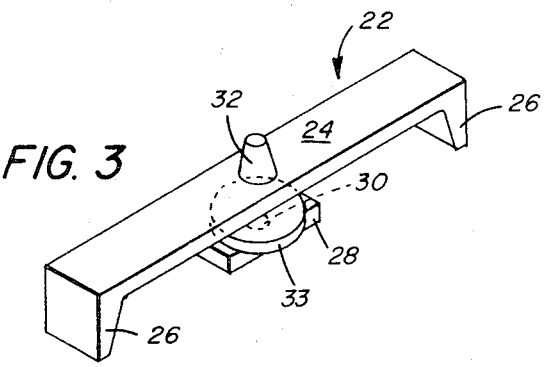
FIG. 3 is a perspective view of the preferred embodiment of the frangible connector of the present invention.

An alternate embodiment is illustrated in FIG. 5 wherein the cartridge and core have the same configuration as that illustrated with the preferred embodiment of the present invention and are provided with the same reference numerals. The alternative embodiment of the frangible connector member 40 is similarly disposed in the cartridge and extends between the core 20 and a portion of the cartridge body. The connector member 40 has a first, C-shaped portion 42 having axially extending arms 44 at the outer extremities which are arranged to engage the ribs 21 of the core 20, with the width of arms 44 being less than the distance between adjacent ribs of the core. A second pad portion 46 of the connector member is axially spaced from the C-shaped portion and is axially disposed on the opposite side from arms 44. The pad portion is connected to the first, C-shaped portion by a frangible, necked-down connection 48 and is arranged to contact the inside surface of the cartridge wall 12. The pad portion is arranged to be sealed to the cartridge wall 12, either by an adhesive, by heat, or by ultrasonic or other welding means whereby the connector member is prevented from rotating and, by means of the engagement of the core ribs 21 by the arms 26, preventing the film product within the cartridge from rotating. The connector member 40 is similarly formed of a plastic material having a known structural strength whereby the necked-down connection 48 may be accurately and repeatably formed to fracture upon the application of a selected, predetermined torque to the connector member. Thus, when the end of the film is pulled, as in a threading operation, the core 20 is rotated, causing the first portion of the connector member to rotate while the second portion is restrained by the connection to the cartridge wall member until the necked-down connection 30 fractures, permitting the rotation of the core 20 about hub 16.

It will thus be seen that the present invention provides a simple and inexpensive connector for preventing the clockspringing of a roll of web material in a cartridge or container. Moreover, the present anticlockspring arrangement does not significantly increase the weight of the package nor does it cause any adverse effects to the film or web product. Furthermore, while the present arrangement successfully prevents the clockspringing of a rolled film or web product during shipment and handling, it does not significantly interfere with the normal usage or supply of the web.

The invention has been described in detail with particular reference to preferred embodiments thereof, but it will be understood that variations and modifications can be effected within the spirit and scope of the invention.

We claim:

1. Means for preventing clockspringing of a wound roll of web material within a cartridge during storage and shipment, said roll of web material including a central core having a plurality of radial ribs in the side wall thereof, said core arranged to rotate with said roll of material within said cartridge, said cartridge having at least one wall member disposed substantially contiguous to the edge of said roll, said clockspring prevention means comprising a connector member having a substantially C-shaped first portion arranged to engage said core and a second portion which is restrained from motion by engagement with said wall member, said first and second portions of said member being joined by a substantially axially disposed frangible neck portion, said frangible neck portion having a substantially predetermined strength whereby it will break when said roll is rotated by a substantially predetermined tensile force on the outer end of the web material so that said roll is freely rotatable in said cartridge after the frangible neck portion is broken.

2. The invention according to claim 1 wherein the substantially C-shaped first portion is arranged to overlie the end of said core with the end portions thereof engaging the ribs on the core.

3. The invention according to claim 2 wherein said wall member is provided with a recess and the second portion of said member extends from the center portion of said C-shaped portion and engages said recess.

4. The invention according to claim 1 wherein said second portion of said member is adhered to said wall member of said cartridge.

5. The invention according to claim 4 wherein said second portion is ultrasonically welded to said wall member.

6. The invention according to claim 1 wherein said cartridge has a core supporting hub extending through said core with said core being rotatable on said hub, said hub being provided with a recess in the end thereof, said second portion of said member extending from the center portion of the C-shaped portion and engaging the recess in the end of said hub.

7. The invention according to claim 6 wherein said recess has a substantially circular central portion and wedge-shaped end portions, and said second portion of said connector member is substantially rectangular in shape.

* * * * *

PO-1050
(5/69)

UNITED STATES PATENT OFFICE
CERTIFICATE OF CORRECTION

Patent No. 3,784,001          Dated January 8, 1974

Inventor(s) C.B. Bushnell, E.J. Sheffer, R.C. Sutliff

It is certified that error appears in the above-identified patent and that said Letters Patent are hereby corrected as shown below:

Column 4, lines 53 and 54, delete "substantially contiguous to" and insert --adjacent--

Signed and sealed this 4th day of June 1974.

(SEAL)
Attest:

EDWARD M. FLETCHER, JR.
Attesting Officer

C. MARSHALL DANN
Commissioner of Patents